US012622445B2

(12) United States Patent
Sim

(10) Patent No.: US 12,622,445 B2
(45) Date of Patent: May 12, 2026

(54) METHOD FOR PREPARING TROPICAL FISH FEED BY USING BRINE SHRIMP, AND TROPICAL FISH FEED PREPARED THEREBY

(71) Applicant: Hong Sun Sim, Anyang-si (KR)

(72) Inventor: Hong Sun Sim, Anyang-si (KR)

( * ) Notice: Subject to any disclaimer, the term of this patent is extended or adjusted under 35 U.S.C. 154(b) by 560 days.

(21) Appl. No.: 18/024,066

(22) PCT Filed: Sep. 2, 2021

(86) PCT No.: PCT/KR2021/011822
    § 371 (c)(1),
    (2) Date: Mar. 1, 2023

(87) PCT Pub. No.: WO2022/050706
    PCT Pub. Date: Mar. 10, 2022

(65) Prior Publication Data
    US 2023/0263188 A1     Aug. 24, 2023

(30) Foreign Application Priority Data

Sep. 2, 2020    (KR) ........................ 10-2020-0111603

(51) Int. Cl.
    *A23K 10/22*        (2016.01)
    *A01K 61/59*        (2017.01)
                (Continued)
(52) U.S. Cl.
    CPC .............. *A23K 10/22* (2016.05); *A01K 61/59* (2017.01); *A23K 10/16* (2016.05); *A23K 40/00* (2016.05); *A23K 50/80* (2016.05)
(58) Field of Classification Search
    CPC ................................ A01K 61/59; A23K 50/80
    See application file for complete search history.

(56) References Cited

U.S. PATENT DOCUMENTS

2003/0203088 A1* 10/2003 Akashe ................... A23L 11/32
                                                       426/431
2013/0316408 A1* 11/2013 Long ....................... A61P 31/04
                                                       435/253.5
                (Continued)

FOREIGN PATENT DOCUMENTS

CN          1653938 A       8/2005
CN          1327782 C       7/2007
                (Continued)

OTHER PUBLICATIONS

Brine Shrimp Direct, Instructions for Hatching Brine Shrimp [Online], published Jan. 21, 2020, [retrieved on 2025-04-232]. Retrieved from the Internet: <URL: https://web.archive.org/web/20200121211818/https://www.brineshrimpdirect.com/about-us/articles/brine-shrimp-hatching-instructions-equipment/ > (Year: 2020).*

(Continued)

*Primary Examiner* — Changqing Li
(74) *Attorney, Agent, or Firm* — ANTONIO HA & U.S. PATENT, LLC

(57)                ABSTRACT

The present invention relates to a method for preparing a tropical fish feed by using brine shrimp, and a tropical fish feed prepared thereby, and, more specifically, to: a method for preparing a tropical fish feed by using brine shrimp, and a tropical fish feed prepared thereby, the method feeding spirulina and Haematococcus to hatched brine shrimp to prepare a tropical fish feed, and thus can promote the growth of tropical fish, boost the immune system and improve the consumption, digestion, absorption and palatability for tropical fish.

7 Claims, 1 Drawing Sheet

(51) Int. Cl.
| | | |
|---|---|---|
| *A23K 10/16* | (2016.01) | |
| *A23K 40/00* | (2016.01) | |
| *A23K 50/80* | (2016.01) | |

(56) References Cited

U.S. PATENT DOCUMENTS

| | | | | |
|---|---|---|---|---|
| 2021/0318285 A1* | 10/2021 | Chu | ...................... | G01N 33/18 |
| 2022/0326237 A1* | 10/2022 | Bossier | ........... | G01N 33/56911 |

FOREIGN PATENT DOCUMENTS

| | | | | | | |
|---|---|---|---|---|---|---|
| CN | 103734502 | A | | 4/2014 | | |
| CN | 106719442 | A | * | 5/2017 | .......... | A01K 67/033 |
| CN | 109619367 | A | * | 4/2019 | | |
| CN | 110741990 | A | * | 2/2020 | | |
| JP | S47-13182 | | | 5/1972 | | |
| JP | 2006-506065 | A | | 2/2006 | | |
| KR | 10-0927683 | | | 11/2009 | | |
| KR | 10-2011-0011022 | | | 2/2011 | | |
| KR | 10-2011-0093437 | | | 8/2011 | | |
| KR | 10-1115287 | | | 3/2012 | | |
| KR | 10-1127311 | | | 3/2012 | | |
| KR | 10-1864147 | | | 6/2018 | | |
| KR | 10-2019-0060026 | | | 6/2019 | | |
| WO | WO2004043139 | A2 | | 5/2004 | | |

OTHER PUBLICATIONS

English Specification of CN103734502A.
English Specification of CN1653938A.
English Specification of 10-1115287.
English Specification of 10-1127311.
English Specification of 10-1864147.
English Specification of 10-2011-0093437.
English Specification of 10-2019-0060026.
English Specification of 10-2011-0011022.
English Specification of CN1327782C.
English Specification of JP2006-506065A.
English Specification of 10-0927683.
English Specification of JPS47-13182.
Naver blog, Mar. 25, 2018, non-official translation (nutrition-enhancing brine shrimp hatching at home). Retrieved on Sep. 20, 2020 from https://blog.naver.com/sh8625/221236830160.
English translation of "Naver blog. Mar. 25, 2018, non-official translation (nutrition-enhancing brine shrimp hatching at home). Retrieved on Sep. 20, 2020 from https://blog.naver.com/sh8625/221236830160".

* cited by examiner

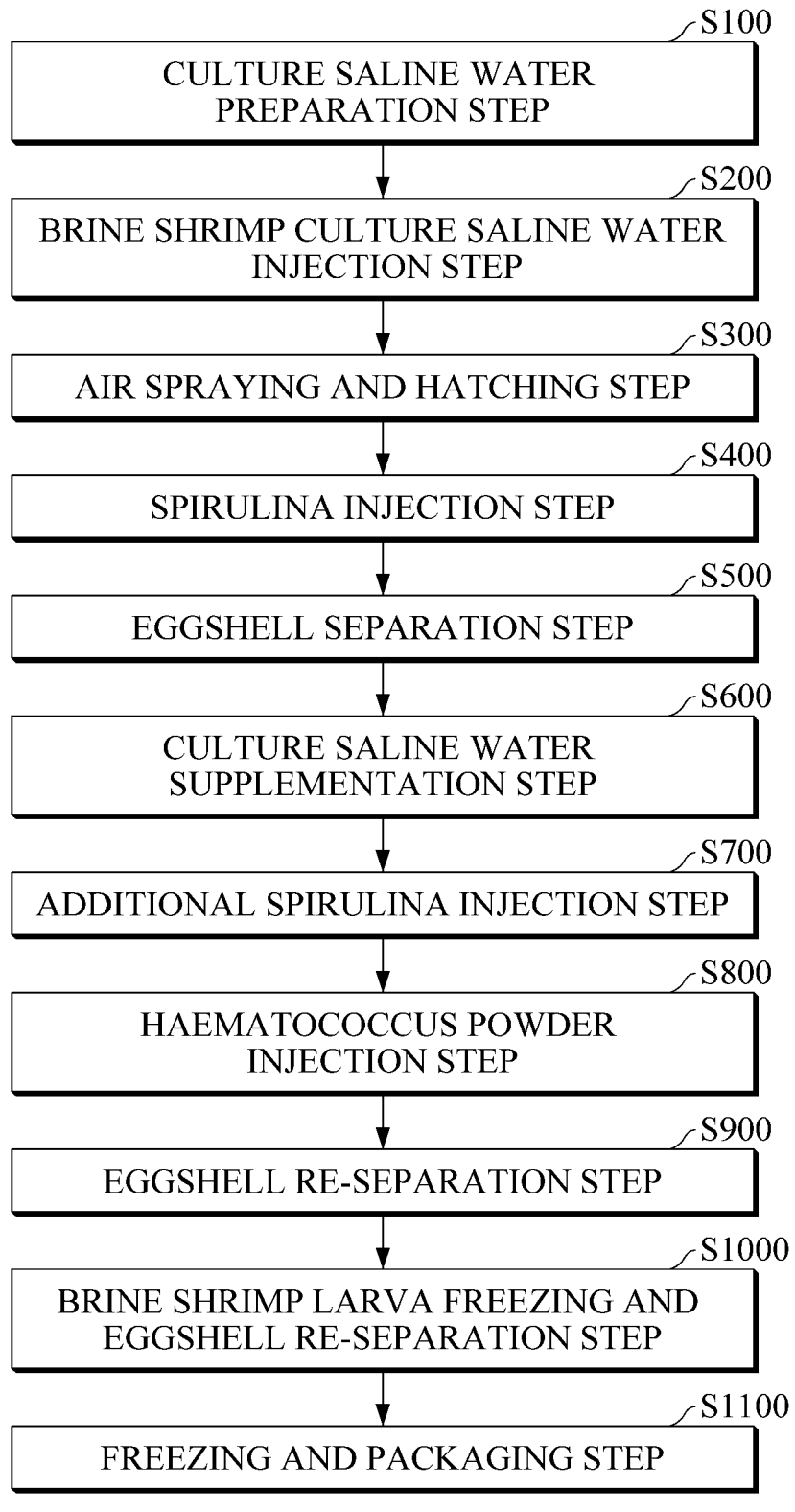

S100
CULTURE SALINE WATER
PREPARATION STEP

S200
BRINE SHRIMP CULTURE SALINE WATER
INJECTION STEP

S300
AIR SPRAYING AND HATCHING STEP

S400
SPIRULINA INJECTION STEP

S500
EGGSHELL SEPARATION STEP

S600
CULTURE SALINE WATER
SUPPLEMENTATION STEP

S700
ADDITIONAL SPIRULINA INJECTION STEP

S800
HAEMATOCOCCUS POWDER
INJECTION STEP

S900
EGGSHELL RE-SEPARATION STEP

S1000
BRINE SHRIMP LARVA FREEZING AND
EGGSHELL RE-SEPARATION STEP

S1100
FREEZING AND PACKAGING STEP

METHOD FOR PREPARING TROPICAL FISH FEED BY USING BRINE SHRIMP, AND TROPICAL FISH FEED PREPARED THEREBY

TECHNICAL FIELD

The present invention relates to a method for preparing tropical fish feed using brine shrimp and a tropical fish feed prepared thereby, and more specifically, a method for preparing tropical fish feed using brine shrimp and a tropical fish feed prepared thereby that promotes the growth and strengthens immunity of tropical fish, strengthens immunity and improves intake, digestion, absorption and palatability of tropical fish.

BACKGROUND ART

Brine shrimp are small aquatic animals used as live feed in fish farming since ancient times and are still used today. Despite the recent development of various dry particulate feeds, the reason why live brine shrimp are in the limelight as fish food is that general users can easily purchase brine shrimp eggs as a product, the brine shrimp are easy to hatch, are small in size and have high nutritional value so that they are the best feeding organism for the health and growth of adult fish and fry. As a result, the demand is increasing for brine shrimp as feed for fish.

The brine shrimp are also commonly referred to as Artemia, and the adult size is 10 to 15 mm, but their eggs and the hatched brine shrimp are less than 1 mm in size, so they are treated as the best feed for young fish with small mouths. However, brine shrimp eggs with unhatched shells and rotten eggs cause indigestion and ascites in young fish and adult fish, so young fish and adult fish are easily killed. Thus, special attention is required. All brine shrimp distributed for direct feeding are eggshell-exfoliated products from which eggshells have been removed or frozen forms immediately after hatching.

For this reason, general users who raise fish can easily purchase brine shrimp eggs that have been dried and stored for hatching online and offline, and they directly hatch eggs using brine shrimp incubators or transparent PET bottles, remove shells and decayed eggs, and collect only hatched brine shrimp, and they are provided as feed for fish.

A brief description of the generally used brine shrimp incubation method, collection device, and method according to the brine shrimp incubator is as follows.

An outlet and a valve are combined at the bottom of a transparent container where the inner surface can be seen to some extent. The container is filled with clean water, salt is added and dissolved, an air pump is connected to supply air continuously, a certain amount of dried brine shrimp eggs is put in the saline water with an appropriate water temperature, and brine shrimp hatch after about 36 to 48 hours.

The incubation proceeds for about 36 to 48 hours, and the brine shrimp wriggling after hatching are identified with the naked eye. When incubation progresses, and it is determined that brine shrimp can be collected, the air pump is turned off and waited for 20 to 30 minutes. The reason is that the water current is stable, the remaining hatched eggshells float on the surface of the water, the hatched brine shrimp move fluidly, and the unhatched eggs and decayed brine shrimp eggs are located in the middle and toward the bottom. Then, in order to use the characteristics of brine shrimp that gather toward the light, the surroundings of the container are made as dark as possible, and light is shined on the bottom of the transparent container so that brine shrimp gather around the light. This is using the instinctive characteristic of hatched brine shrimp that strongly gather toward the light emitting portion when they see the light.

The methods for collecting brine shrimp gathered in this way includes attaching a valve to the bottom of the incubation container and collecting it by opening the valve, and directly collecting brine shrimp that are slightly clustered using a pipette or syringe.

All of the above methods can collect hatched brine shrimp, but the collecting method by opening the valve may collect unhatched but decayed brine shrimp eggs, unhatched eggs, and some eggshells in addition to hatched eggs so it is fundamentally a problem that only hatched brine shrimp, which are the best feed conditions for fish, cannot be collected.

In addition, there is a big problem that when rotten brine shrimp eggs and eggshells left after hatching are provided to other tanks as fish food, the water quality is rapidly polluted, and adult fish and fry eat them to induce indigestion and ascites, thereby causing death. Further, there are unavoidable problems that the direct collection method using a pipette or syringe has a small amount of hatched brine shrimp collected, and the sorting operation is cumbersome and practically difficult, so the brine shrimp hatched with a lot of time and effort have to be discarded along with the shells in addition to the above problems.

Further, there are problems in the case of hatching brine shrimp eggs in small quantities. If brine shrimp are hatched just enough to be provided as feed, there is the inconvenience of repeating the incubation procedure, and repeated collection procedures that do not completely separate and collect hatched brine shrimp, which are inefficient and uneconomical.

Prior art documents in the technical field to which the present invention belongs include Korean Patent Registration No. 10-1127311, Korean Patent Registration No. 10-0927683, and Korean Patent Publication No. 10-2019-0060026.

DISCLOSURE

Technical Problem

The present invention provides a method for preparing a tropical fish feed using brine shrimp, and a tropical fish feed prepared thereby, the method feeding spirulina and Haematococcus to hatched brine shrimp to prepare a tropical fish feed, and thus can promote the growth of tropical fish, boost the immune system and improve the consumption, digestion, absorption and palatability for tropical fish.

Further, the present invention provides a method for preparing a tropical fish feed using brine shrimp, and a tropical fish feed prepared thereby, by strengthening the immunity of tropical fish to prevent diseases and water pollution and being refrigerated and stored, thereby keeping the feed in a fresh state for a long period of time.

Various problems to be solved by the present invention are not limited to the problems mentioned above, and other problems not mentioned are clearly understood by those skilled in the art from the description below.

Technical Solution

The method of preparing a tropical fish feed using brine shrimp according to the present invention comprises culture saline water preparation step (S100) of preparing culture saline water; brine shrimp culture saline water introduction step (S200) of by injecting a brine shrimp egg into the prepared culture saline water to prepare to hatch the brine shrimp egg; air spraying and hatching step (S300) of circulating air in the culture saline water into which the brine shrimp egg is injected to spray a fine bubble, thereby hatching the brine shrimp egg; spirulina injection step (S400) of first injecting spirulina after hatching of the brine shrimp egg; eggshell separation step (S500) of separating and removing eggshell of the hatched brine shrimp egg; culture saline water supplementation step (S600) of supplementing and supplying culture saline water of the same concentration to the culture saline water from which the eggshell is separated; additional spirulina injection step (S700) of additionally injecting spirulina to supply nutrients to the hatched brine shrimp after supplementing and supplying culture saline water of the same concentration; Haematococcus powder injection step (S800) of injecting Haematococcus powder to the culture saline water to which the spirulina is additionally injected; eggshell re-separation step (S900) of re-separating and removing the eggshell from the culture saline water into which the Haematococcus powder is injected, thereby separating and collecting only brine shrimp larva; brine shrimp larva freezing and eggshell re-separation step (S1000) of freezing and storing the separated and collected brine shrimp larva, thereby freezing the brine shrimp larva, and re-separating and removing eggshell contained in the frozen brine shrimp larva; and freezing and packaging step (S100) of freezing and packaging the brine shrimp larva from which eggshell is re-separated after freezing to prepare the tropical fish feed.

In the culture saline water preparation step (S100), the culture saline water may be prepared by dissolving 33 to 50 g of salt in 1 liter of purified water having a water temperature of 28 to 30° C.

In the brine shrimp culture saline water injection step (S200), the brine shrimp egg may be refrigerated and stored at a temperature of −8 to −4° C., and the refrigerated and stored brine shrimp eggs is stored for 12 to 20 hours at a temperature of 15 to 25° C. and then injected into the prepared culture saline water, and in the brine shrimp culture saline water input step (S200), the brine shrimp egg may be injected at a ratio of 330 g to 350 g of brine shrimp eggs per 120 liters of culture saline water.

In the air spraying and hatching step, air may be sprayed at an amount of 6.5 to 7.5 L/min to the culture saline water into which the brine shrimp egg is injected to generate a fine bubble, light with 2000 to 2500 lux may be applied to the top and side of the culture saline water for up to 36 hours, and light with 1000 lux may be maintained until the brine shrimp egg hatches.

In the spirulina injection step (S400), after 18 hours have elapsed since the brine shrimp eggs started to hatch, 1.5 to 2.5 g of spirulina may be first injected per 330 to 350 g of the brine shrimp egg.

In the additional spirulina injection step (S700), 2 to 8 g of spirulina may be additionally injected at intervals of 90 to 120 minutes until 48 hours have elapsed after 18 hours have elapsed after the brine shrimp eggs hatched and the spirulina has been first injected so that 90 to 100 g of total spirulina may be injected per 330 to 350 g of brine shrimp eggs.

In the Haematococcus powder injection step (S800), Haematococcus powder may be injected into a grinder at a weight ratio of 2 g of Haematococcus powder per 800 mL of water, and then pulverized for 1 to 2 minutes, and Haematococcus powder pulverized with the water may be injected into the hatched brine shrimp for 5 times at 2 g each from 40 hours to 50 hours after hatching of the brine shrimp egg.

In the eggshell re-separation step (S900) the culture saline water may be passed through a pipe-shaped tube having a length of 1 to 1.5 meters, and circular magnets having a magnetic force of 10000 to 12000 Gauss are installed on both sides of the pipe-shaped tube to separate the iron-coated eggshell passing through the pipe-shaped tube to separate and collect only brine shrimp larva.

In the brine shrimp larva freezing and storing eggshell re-separation step (S1000), the separated and collected brine shrimp larva may be frozen and stored for 2.5 to 3.5 hours.

Further, the present invention includes a tropical fish feed using brine shrimp prepared by the above method.

Details of other embodiments are included in the detailed description.

Advantageous Effects

The method for preparing a tropical fish feed using brine shrimp according to the present invention may comprise feeding spirulina and Haematococcus to hatched brine shrimp to prepare a tropical fish feed, and thus can promote the growth of tropical fish, boost the immune system and improve the consumption, digestion, absorption and palatability for tropical fish.

Further, the tropical fish feed using brine shrimp prepared according to the present invention may strengthen the immunity of tropical fish to prevent diseases and water pollution and be refrigerated and stored, thereby keeping the feed in a fresh state for a long period of time.

It is fully understood that embodiments of the technical idea of the present invention may provide various effects not specifically mentioned.

DESCRIPTION OF DRAWINGS

FIG. 1 is a flow chart for explaining a method for preparing tropical fish feed using brine shrimp according to the present invention.

MODE FOR INVENTION

Advantages and characteristics of the present invention, and methods for achieving them become clear with reference to the embodiments described later in detail. However, the present invention is not limited to the embodiments described herein and may be embodied in other forms. Rather, the embodiments introduced herein are provided so that the disclosed content is thorough and complete, and the spirit of the present invention is sufficiently conveyed to those skilled in the art.

Terms used in this application are only used to describe specific embodiments and are not intended to limit the present invention. Singular expressions include plural expressions unless the context clearly dictates otherwise.

Unless defined otherwise, all terms used herein, including technical or scientific terms, have the same meaning as commonly understood by one of ordinary skill in the art to which the present invention belongs. Terms such as those defined in commonly used dictionaries should be interpreted as having a meaning consistent with the meaning in the context of the related art, and unless explicitly defined in this application, it is not to be construed in an ideal or overly formal sense.

Hereinafter, with reference to the accompanying drawings, a method for preparing a tropical fish feed using brine shrimp according to the present invention is described in detail with a preferred embodiment.

FIG. 1 is a flow chart for explaining a method for preparing tropical fish feed using brine shrimp according to the present invention.

Referring to FIG. 1, the method for preparing tropical fish feed using brine shrimp according to the present invention comprises culture saline water preparation step (S100), brine shrimp culture saline water injection step (S200), air spraying and hatching step (S300), spirulina injection step (S400), eggshell separation step (S500), culture saline water supplementation step (S600), additional spirulina injection step (S700), Haematococcus powder injection step (S800), eggshell re-separation step (S900), brine shrimp larva freezing and eggshell re-separation step (S1000), freezing and packaging step (S1100).

1. Culture Saline Water Preparation Step (S100)

The culture saline water preparation step (S100) is a step of preparing culture saline water for culturing brine shrimp.

In the culture saline water preparation step (S100), the culture saline water can be prepared using purified water from which chlorine, bacteria, etc. are removed by nano filtering. For example, the culture saline water has a temperature of 28 to 30° C., and the culture saline water prepared by dissolving 33 to 50 g of salt in 1 liter (L) of purified water may be used.

2. Brine Shrimp Culture Saline Water Injection Step (S200)

The brine shrimp culture saline water injection step (S200) is a step of preparing to hatch the brine shrimp eggs by injecting brine shrimp eggs into the prepared culture saline water.

In the brine shrimp culture saline water injection step (S200), the brine shrimp eggs refrigerated and stored at −8 to −4° C. may be used as a brine shrimp egg, and the refrigerated and stored brine shrimp eggs may be kept at a temperature of 15 to 25° C. for 12 to 20 hours and then may be injected into the culture saline water.

In the brine shrimp culture saline water injection step (S200), an optimal environment for hatching the brine shrimp eggs can be created by injecting brine shrimp eggs into the prepared culture saline water. For example, in the brine shrimp culture saline water input step (S200), it can be performed by injecting brine shrimp eggs at a rate of 330 to 350 g per 120 liters (L) of culture saline water.

3. Air Spraying and Hatching Step (S300)

The air spraying and hatching step (S300) is a step of hatching brine shrimp eggs by spraying fine bubbles by circulating air in the culture saline water into which the brine shrimp eggs are injected.

In the air spraying and hatching step (S300), air is sprayed at an amount of 6.5 to 7.5 L/min to the culture saline water into which the brine shrimp eggs are injected to minimize the impact applied to the brine shrimp eggs to remove fine bubbles and to hatch the brine shrimp eggs by installing natural light, artificial light, or underwater light for the synthesis of vitamin D in the body. For example, it may proceed by maintaining the light of 2000 to 2500 lux on the top and side of the culture saline water for up to 36 hours, and then maintaining the light of 1000 lux until brine shrimp eggs hatch.

4. Spirulina Injection Step (S400)

The spirulina injection step (S400) is the first step of injecting spirulina after hatching the brine shrimp eggs.

In the spirulina injection step (S400), after the hatching of the brine shrimp eggs, spirulina can be injected to supply nutrients to the hatched brine shrimp. For example, in the spirulina injection step (S400), 1.5 to 2.5 g of spirulina is first injected per 330 to 350 g of the brine shrimp eggs after 18 hours have elapsed since the brine shrimp eggs hatched to maximize nutrients of the hatched brine shrimp.

The spirulina is a spiral multicellular microorganism of blue-green algae and has chlorophyll and phycocyan pigment to photosynthesize. It is native to Ethiopia and has a protein content of more than 60%, attracting attention as a future protein source along with chlorella. Currently, about 30 species are known, and they are native to salt lakes in the tropics. Spirulina is a type of cyanobacteria that grows in seawater and tropical hot water with high salinity and strong alkalinity and is a mixed form of plants and animals.

The composition of spirulina is composed of 60-70% protein, 6-9% lipid, and 15-20% carbohydrate and contains vitamins, minerals, fiber, etc., and pigments such as carotenoids, chlorophyll, and phycocyan. It has the advantage of containing all essential amino acids, is rich in essential fatty acids such as linolenic acid and gamma linolenic acid and being easily digested with a digestion and absorption rate of over 95%.

The safety of spirulina as a health food and its nutritional value as a complete food is officially recognized by the United Nations (UN), World Health Organization (WHO), and the US Food and Drug Administration (FDA) and are also determined by the National Aeronautics and Space Administration (NASA) as emergency food for astronauts. In addition to nutritional value and usefulness as a health food, spirulina's anti-cancer effect, various immune function enhancing effects, and potential as a functional cosmetic material have been studied and reported.

5. Eggshell Separation Step (S500)

The eggshell separation step (S500) is a step of separating and removing the eggshell of the hatched brine shrimp eggs.

In the eggshell separation step (S500), after 40 hours have elapsed since the brine shrimp eggs began to hatch, the eggshell of the brine shrimp eggs can be separated using a bar magnet. For example, in the eggshell separation step (S500), 70 to 80% of the eggshell can be removed by separating the eggshell using the bar magnet.

At this time, in the eggshell separation step (S500), the eggshell can be removed after stopping the injection of fine bubbles through the air. In the eggshell separation step (S500), the spraying of the fine bubbles is stopped for 10 to 30 seconds, thereby preventing slow growth or death of the hatched brine shrimp due to lack of oxygen.

6. Culture Saline Water Supplementation Step (S600)

The culture saline water supplementation step (S600) is a step of supplementing and supplying culture saline water with the same concentration to the culture saline water from which the eggshell was separated.

In the culture saline water supplementation step (S600), after removing 20% by weight of the culture saline water from which the eggshell is separated, 24 liters (L) of culture saline water of the same concentration is gradually replenished for 1 hour. For example, in the culture saline water supplementation step (S600), the culture saline water at a temperature of 26 to 28° C. is gradually replenished to alleviate the water contamination caused by the decrease in ammonia level and prevent the growth slowdown or death of brine shrimp due to sudden environmental changes.

7. Additional Spirulina Injection Step (S700)

The additional spirulina injection step (S700) is a step of supplementing and supplying culture saline water with the same concentration and then additionally injecting spirulina to supply nutrients to the hatched brine shrimp.

In the additional spirulina injection step (S700), 2 to 8 g of spirulina is additionally injected at intervals of 90 to 120 minutes until 18 hours have passed since the brine shrimp eggs hatched and 48 hours have passed since the first spirulina was injected so that 90 to 100 g of total spirulina may be injected and ingested per 330 to 350 g of brine shrimp eggs. In the additional spirulina injection step (S700), when the injection amount of spirulina is out of the above range, the saline culture water may be contaminated, or the hatched brine shrimp may have a problem of food shortage.

8. Haematococcus Powder Injection Step (S800)

The Haematococcus powder injection step (s800) is a step of injecting Haematococcus powder into culture saline water in which the spirulina is additionally injected.

In the Haematococcus powder injection step (S800), Haematococcus powder may be injected into a grinder at a weight ratio of 2 g of Haematococcus (containing 6% by weight of astaxanthin) powder per 800 mL of water, and then pulverized for 1 to 2 minutes, and Haematococcus powder pulverized with the water may be injected into the hatched brine shrimp for 5 times at 2 g each, that is, a total of 10 g, from 40 hours to 50 hours after hatching of the brine shrimp egg, thereby supplying nutrients.

In the Haematococcus powder injection step (S800), the Haematococcus is a microalga that synthesizes astaxanthin, a high-value-carotenoid. Unlike general microalgae that maintain almost similar cell morphologies during the entire period of growth, its cell shape changes according to the surrounding environment in culture.

In other words, in an environment with many nutrients around and the light intensity is not high, it lives in the form of a moving green ellipse with flagella. As the light intensity gradually increases, it loses its flagella and turns into a round green cell. In this state, light is gradually used for photosynthesis, and the size of the cell increases. Through this process, the size of the cell becomes so different that it has a mass more than 5 times higher than that of the initial flagellum-shaped elliptical cell.

Further, when the surrounding environment exceeds the general range for survival and is subjected to stress, carotenoid-based pigments are synthesized in the cells to overcome this, and the cells gradually turn red. If the stimulation continues, astaxanthin is synthesized to about 4-5% of the dry weight, and it has the form of red cells, unlike the green cells at the beginning.

Astaxanthin, which is contained in a large amount in Haematococcus, has antioxidant activity 500 times higher than vitamin E, a representative antioxidant, and 20 times higher than beta-carotene. Due to this high antioxidant activity, astaxanthin is widely used as a pharmaceutical, food additive, and feed additive for animals and fry.

9. Eggshell Re-Separation Step (S900)

The eggshell re-separation step (S900) is a step of separating and collecting only brine shrimp larvae by re-separating and removing the eggshell from the culture saline water into which the Haematococcus powder is injected.

In the eggshell re-separation step (S900), the spirulina and Haematococcus powders are injected to supply nutrients for a total of 50 hours, and then the culture saline water is passed through a tube in which a circular magnet is installed, thereby removing the eggshell.

For example, in the eggshell re-separation step (S900), the culture saline water may be passed through a pipe-shaped tube having a length of 1 to 1.5 meters, and circular magnets having a magnetic force of 10000 to 12000 Gauss are installed on both sides of the pipe-shaped tube to separate the iron-coated eggshell passing through the pipe-shaped tube to separate and collect only brine shrimp larva.

10. Brine Shrimp Larva Freezing and Eggshell Re-Separation Step (S1000)

The brine shrimp larva freezing and eggshell re-separation step (S1000) is a step of freezing and storing the separated and collected brine shrimp larva and re-separating and completely removing the eggshell contained in the frozen brine shrimp larva.

In the brine shrimp larva freezing and eggshell re-separation step (S1000), the separated and collected brine shrimp larva is frozen and stored for 2.5 to 3.5 hours to freeze and kill the brine shrimp larva, and it may be performed by re-separating and completely removing the eggshell contained in the frozen brine shrimp larva.

For example, in the brine shrimp larva freezing and eggshell re-separation step (S1000), the frozen brine shrimp larva may be injected into the water to remove the eggshell. The eggshell contained in the frozen brine shrimp larva may be re-separated and completely removed using the characteristics of non-swimming and sinking of the frozen and dead brine shrimp and floating to the top of the eggshell.

In the brine shrimp larva freezing and eggshell re-separation step (S1000), the eggshell contained in the frozen brine shrimp larva is completely removed to solve the problem of tropical fish fry eating brine shrimp larvae containing eggshells and causing indigestion and ascites disease to die.

11. Freezing and Packaging Step (S1100)

The freezing and packaging step (S1100) is a step of preparing tropical fish feed by freezing and packaging the brine shrimp larva whose eggshells are re-separated after freezing.

For example, in the freezing and packaging step (S1100), the frozen and then re-separated brine shrimp larva may be commercialized as feed for tropical fish by packaging the brine shrimp larva so that the moisture content is less than 93.3% and then refrigerating and storing at a temperature of −27° C. or less. Since the configuration of the step of freezing and packaging the brine shrimp larvae is a known technique, a detailed description thereof is excluded for convenience of description and clarity of the technical idea of the present invention.

Hereinafter, with reference to the accompanying drawings, a method for preparing a tropical fish feed using brine shrimp according to the present invention is described in detail with a preferred embodiment.

Embodiment

First, culture saline water was prepared by dissolving salt in purified water at a temperature of 29° C., in which chlorine, bacteria, etc., were removed by nano filtering.

Next, the brine shrimp eggs refrigerated and stored at −6° C. in the culture saline water were stored at a temperature of 20° C. for 15 hours and then injected into the prepared culture saline water. At this time, it was injected at a rate of 343 g of brine shrimp eggs per 120 liters (L) of culture saline water.

Next, the air was sprayed at an amount of 7 L/min to the culture saline water into which the brine shrimp eggs were injected to generate fine bubbles, and the light with 2200 lux was maintained on the top and side of the container in which the culture saline water was accommodated for up to 36 hours, and then the light with 1000 lux was maintained until brine shrimp eggs hatched.

Subsequently, after 18 hours had elapsed since the brine shrimp eggs began to hatch, 2 g of spirulina was initially injected per 343 g of the brine shrimp eggs. After 40 hours had elapsed since the brine shrimp eggs began to hatch, the eggshells of the brine shrimp eggs were separated using a bar magnet.

Next, after separating and removing 20% by weight of the culture saline water from which the eggshell is separated, 24 liters (L) of culture saline water with the same concentration and a temperature of 27° C. is gradually replenished for 1 hour. 2 to 8 g of spirulina is additionally injected at intervals of 90 to 120 minutes until 18 hours had elapsed after the hatching of the brine shrimp eggs and 48 hours had elapsed since the first spirulina was injected so that 96 g of total spirulina was injected per 343 g of brine shrimp eggs, followed by ingestion.

Next, Haematococcus powder may be injected into a grinder at a weight ratio of 2 g of Haematococcus (containing 6% by weight of astaxanthin) powder per 800 mL of water, and then pulverized for 1.5 minutes, and Haematococcus powder pulverized with the water was injected into the hatched brine shrimp for 5 times at 2 g each, that is, a total of 10 g, from 40 hours to 50 hours after hatching of the brine shrimp egg, thereby supplying nutrients.

Then, the spirulina and Haematococcus powders were injected to supply nutrients for a total of 50 hours. Thereafter, the culture saline water was passed through a 1.3-meter tube equipped with a circular magnet having a magnetic force of 11000 Gauss to remove the eggshell, thereby separating only the brine shrimp larva. The brine shrimp larva was frozen and stored for 3 hours, thereby freezing and killing the brine shrimp larva, and the eggshell contained in the frozen brine shrimp larva was re-separated and completely removed to prepare a tropical fish feed.

Comparative Example

A tropical fish feed was prepared in the same manner as in Embodiment, but in Comparative Example, spirulina and Haematococcus powder were not ingested by brine shrimp, unlike the Embodiment.

1. Experiments on Fish Body Weight Gain

An experiment was performed in which tropical fish feed prepared according to Embodiments and Comparative Examples was injected to flounder fry to investigate the growth rate of flounder fry, and the results are shown in [Table 1] below.

The aquaculture experiment was conducted on flounder fry in a seawater farm, and 345 flounder fry were cultured for 30 days at a water temperature of 15 to 25° C., and tropical fish feed prepared according to Embodiments and Comparative Examples was mixed with commercially available fish feed at a rate of 10 g per 1 kg of the commercially available fish feed, and the mixture was supplied to the flounder fry daily.

TABLE 1

| | Average weight (g) | | | |
|---|---|---|---|---|
| Classification | Day 1 | Day 30 | Weight gain (g) | Growth rate (%) |
| Embodiment | 135.8 | 175.9 | 40.1 | 29.5 |
| Comparative Example | 136.4 | 163.7 | 27.3 | 20.0 |

Referring to [Table 1], a weight gain of 29.5% was observed in the Embodiment for 30 days, whereas a weight gain of 20.0% was observed in the Comparative Example.

It is determined that the tropical fish feed prepared according to Embodiment promotes the growth of the fish body and promotes the intake, digestion, and absorption of nutrients, thereby increasing the body weight of the fish body.

2. Experiment on Fish Mortality

An experiment was performed in which the tropical fish feed prepared according to Embodiments and Comparative Examples was injected to flounder fry to investigate the mortality rate of flounder fry, and the results are shown in [Table 2] below.

The aquaculture experiment was conducted on flounder fry in a seawater farm, and 345 flounder fry were cultured for 30 days at a water temperature of 15 to 25° C., and tropical fish feed prepared according to Embodiments and Comparative Examples was mixed with commercially available fish feed at a rate of 10 g per 1 kg of the commercially available fish feed, and the mixture was supplied to the flounder fry daily.

TABLE 2

| | Number of fish | | |
|---|---|---|---|
| Classification | Day 1 | Day 30 | Morality (%) |
| Embodiment | 345 | 345 | 0 |
| Comparative Example | 336 | 318 | 5.3 |

Referring to [Table 2], while the comparative example showed a mortality rate of 5.3%, the Embodiment showed a mortality rate of 0%, confirming that the survival rate of fish that consumed the feed according to the Embodiment was excellent.

Although a preferred embodiment of the present invention has been described above, those skilled in the art to which the present invention pertains will understand that the present invention can be embodied in other specific forms without changing its technical spirit or essential features. Therefore, one Embodiment described above should be understood as illustrative in all respects and not limiting.

The invention claimed is:

1. A method of preparing a brine shrimp-based tropical fish feed, the method comprising:
  S100: preparing culture saline water;
  S200: adding a brine shrimp egg to the culture saline water of step S100 to prepare to hatch the brine shrimp egg;
  S300: circulating air in the culture saline water of step S200 to generate a fine air bubble in the culture saline water, thereby hatching the brine shrimp egg;
  S400: adding a first spirulina to the culture saline water of step S300 after hatching of the brine shrimp egg;
  S500: separating and removing eggshell of the hatched brine shrimp egg from the culture saline water of step S400;
  S600: adding culture saline water having the same concentration as the culture saline water of step S100 to the culture saline water of S500;
  S700: adding a second spirulina to the cultured saline water formed in step S600 to supply nutrients to a hatched brine shrimp larva;
  S800: adding Haematococcus powder to the culture saline water of step S700;

S900: separating and removing additional eggshell from the culture saline water of step S800, and collecting the brine shrimp larva;

S1000: freezing the collected brine shrimp larva, followed by re-separating and removing eggshell remaining in the frozen brine shrimp larva; and S1100, freezing and packaging the brine shrimp larva of step S1000 to obtain the brine shrimp-based tropical fish feed, wherein in step S400, after 18 hours have elapsed since the brine shrimp egg starts to hatch, the first spirulina is added to the culture saline water at a weight ratio of 1.5-2.5 g spirulina/330-350 g brine shrimp egg;

wherein in step S700, the second spirulina is added at an interval of 90-120 minutes until 48 hours have elapsed after 18 hours have elapsed after the brine shrimp egg hatches and the first spirulina is added so that a total of 90-100 g spirulina is added per 330-350 g of brine shrimp egg;

wherein step S800 comprises mixing a *Haematococcus* powder with water at a weight ratio of 2 g *Haematococcus* powder per 800 ml of water to form a mixture; placing the mixture in a grinder; pulverizing the mixture for 1 to 2 minutes, and adding the pulverized mixture to the culture saline water of step S700 for 5 times at 2 g each from 40 hours to 50 hours after hatching of the brine shrimp egg; and wherein in step S1000, the collected brine shrimp larva is frozen for 2.5-3.5 hours and then introduced into fresh culture saline water to completely remove eggshell remaining from the hatched brine shrimp egg based on sinking of the frozen brine shrimp larva and floating of the eggshell.

2. The method of claim 1, wherein the culture saline water of step S100 is prepared by dissolving 33-50 g salt in 1 liter of purified water having a temperature of 28-30° C., and wherein in step S200, prior to adding the brine shrimp egg to the culture saline water, a stock brine shrimp egg is refrigerated and stored at a temperature of –8 to –4° C., and the refrigerated and stored brine shrimp egg is then stored for 12 to 20 hours at a temperature of 15 to 25° C., and the brine shrimp egg is added to the culture saline water at a ratio of 330 g to 350 g of brine shrimp egg per 120 liters of culture saline water.

3. The method of claim 2, wherein in step S300, air is circulated at an amount of 6.5 to 7.5 L/min into the culture saline water to generate the fine air bubble, light with 2,000 to 2,500 lux is applied to the top and side of the culture saline water for up to 36 hours, and light with 1,000 lux is maintained until the brine shrimp egg hatches.

4. The method of claim 3, wherein in step S900, the culture saline water is passed through a pipe-shaped tube having a length of 1 to 1.5 meters, and circular magnets having a magnetic force of 10,000 to 12,000 Gauss are installed on both sides of the pipe-shaped tube to separate the eggshell passing through the pipe-shaped tube to separate and collect brine shrimp larva.

5. A brine shrimp-based tropical fish feed prepared by the method of claim 1.

6. The method of claim 1, wherein in step S500, after 40 hours have elapsed since hatching of the brine shrimp egg starts, air circulation in the culture saline water is stopped for 10 to 30 seconds and the eggshell of the hatched brine shrimp egg is separated using a bar magnet such that 70 to 80% of the eggshell of the hatched brine shrimp egg is removed.

7. The method of claim 1, wherein in step S600, 20 wt % of the culture saline water of step S500 is first removed, and then 24 liters of culture saline water having a temperature of 26-28° C. is gradually added to the remaining 80% culture saline water.

* * * * *